Jan. 17, 1950     J. S. HORVATH     2,495,064
MOLD WITH TUNGSTEN CARBIDE INSERT
Filed Aug. 19, 1947
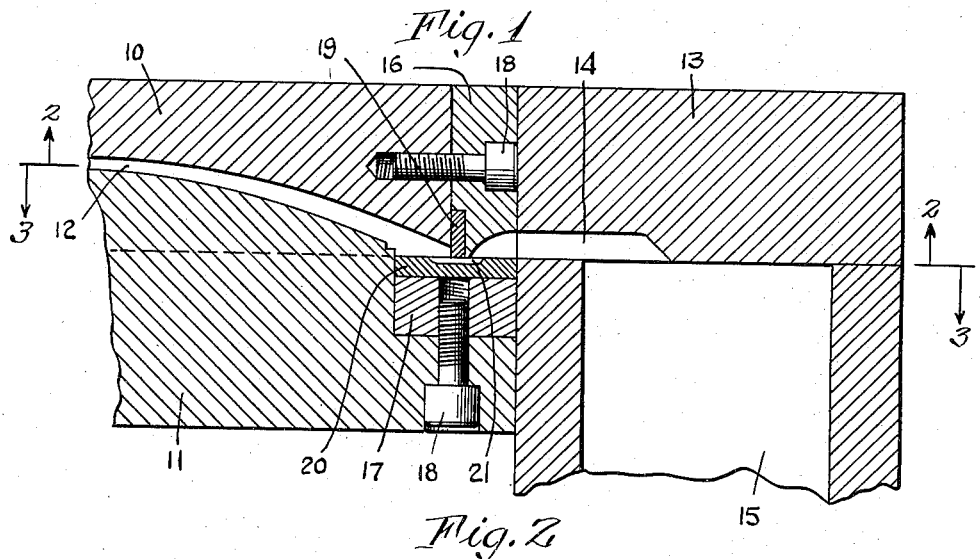
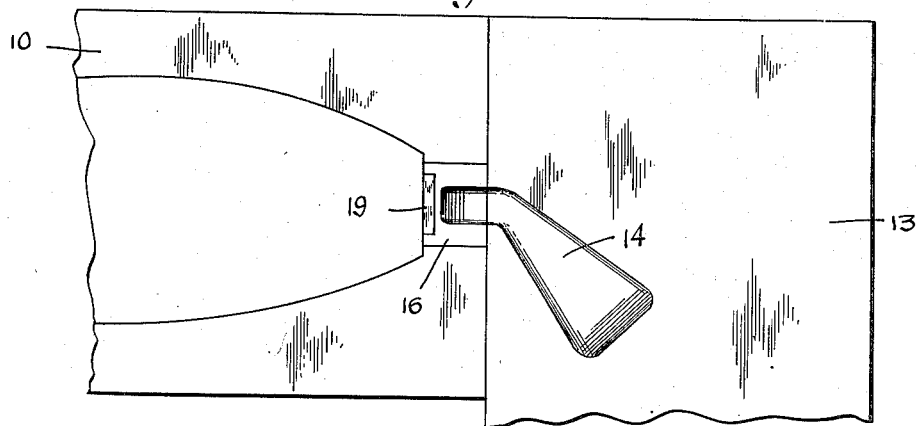
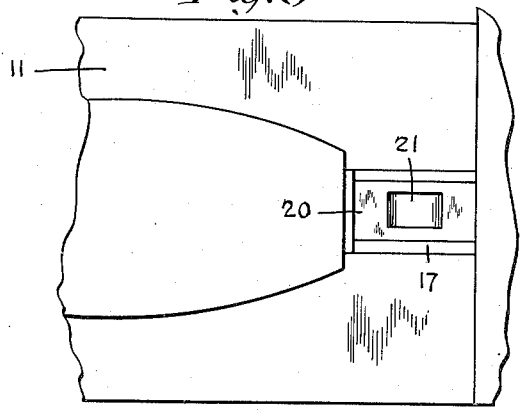
INVENTOR.
Joseph S. Horvath
BY
Johnson and Kline
ATTORNEYS Patented Jan. 17, 1950

2,495,064

UNITED STATES PATENT OFFICE 2,495,064

MOLD WITH TUNGSTEN CARBIDE INSERT

Joseph S. Horvath, Bridgeport, Conn., assignor to The Plastic Mold Die & Tool, Inc., Bridgeport, Conn., a corporation of Connecticut Application August 19, 1947, Serial No. 769,338

4 Claims. (Cl. 18—47)

This invention relates to molds having cavities into which moldable material is introduced to produce formed or shaped parts, and relates more particularly to molds having gates which are especially wear-resistant.

The invention is shown as applied to a mold for forming parts of plastic material; however it should be understood that this showing is not to be taken in a restrictive sense, since the invention has utility in connection with other molds, for other uses.

Molds for the transfer molding of plastics have one or more cavities for receiving and shaping the molding material, each cavity being connected with a channel or gate through which the molding material is forced in entering the cavity. Directly adjacent the cavity the gate is formed with a constricted portion, which provides a thin section in the sprue that extends from the molded part, and enables the said part to be more completely formed and readily severed from the sprue without disfiguration.

Parts of a mold are normally hardened, this being usually done by packing due to hardness being required mostly at the surface and because of the large mass involved and necessity to avoid warpage. In spite of this hardening, however accomplished, considerable wear is experienced at the constricted portion of the gate and adjacent part of the cavity, especially when molding with urea resins. Attempts have been made in the past to reduce this wear by the use of small wear-resistant inserts of tungsten carbide or the like, at the constricted portions of the gates and adjacent cavity portions. Economy in the use of this material and the brittleness of the material necessitate that such inserts be of small size, not greatly larger than the surfaces subject to wear. Accordingly, it has been the practice in the use of wear-resistant carbides to recess the wearing parts and braze or silver solder such inserts in place to the walls of the wearing parts. When attempts were made to overcome the wear at the gates of a mold by silver soldering or brazing a wear-resistant insert in the recesses in molds which had to be hardened previously, by packing, it was found that the temper or hardness of the mold was considerably impaired. In hardening, these molds are usually drawn from temperatures of approximately 1400° F. down to 350° F. Silver soldering requires a temperature in the neighborhood of 1300° F., and brazing requires temperatures around 1700° F. Molds thus provided with inserts were less satisfactory than if not so provided, since after a period of use the cavities themselves showed wear due to loss of hardening, thereby altering the shape of the molded product and making it necessary to discard the mold entirely.

The above difficulty is overcome by the present invention, which provides an improved wear-resistant mold having pack-hardened parts and having soldered wear-resisting inserts at the portions most subject to wear and in which the normal hardness of the mold parts is unimpaired so that the cavities thereof do not wear unduly, the inserts being securely held in place by solder at the constricted portions of the gates and adjacent portions of the mold cavities. This is accomplished by recessing or cutting away the mold parts to a much greater extent than is normally required to accommodate the inserts, and by providing special steel mounting blocks to which the inserts may be soldered, and which are sized to fit the enlarged recesses, and secured to the mold parts by means not involving heat, as with bolts. The mounting blocks may, due to their large size, be shaped so as to constitute part of the cavity and gate surfaces, and are made from air-hardening steel or high speed steel or an equivalent which has a high decalescence temperature whereby the blocks may be hardened and then have the wear-resisting inserts soldered to them, as by silver soldering or brazing, without losing their temper.

By this organization, the parts of the mold at the constricted portions of the gates, which are of critical dimension and are subjected to the greatest abrasive action, may be provided with carbide or equivalent wear-resisting inserts securely soldered in place, while the remainder of the mold retains its normal hardness, thereby considerably increasing the mold life. Moreover, since the mounting blocks are secured in place by bolts, the carbide inserts and blocks may be removed from a mold and readily replaced if necessary, thus saving the mold from being scrapped should one set of inserts become worn too much prior to deterioration beyond use of the rest of the mold.

Other features and advantages will hereinafter appear.

In the accompanying drawings:

Figure 1 is a fragmentary sectional view through an improved mold made in accordance with the invention.

Fig. 2 is a view taken on line 2—2 of Fig. 1, and

Fig. 3 is a view taken on line 3—3 of Fig. 1.

As shown, an improved mold made in accordance with the invention may comprise a cavity block 10 which is cooperable with a force block 11, the said blocks being so disposed and shaped as to provide a molding cavity 12 between them. The blocks 10 and 11 may be advantageously formed of steel, pack hardened and drawn for example to a temperature in the neighborhood of 350° F.

Associated with the blocks 10 and 11 is a runner block 13 having a channel or gate 14 and a pot 15 in which the molding material is carried, the said runner block and pot being also of pack-hardened steel. As shown in Figs. 1 and 2 the gate 14 connects with the cavity 12 and is constricted at the point of connection, and when the mold is put in use most wear will occur at the constricted part of the gate 14 and the adjacent part of the cavity 12. Such wear may be quite appreciable despite the pack-hardening of the mold parts, especially when molding with urea-resins.

According to this invention, small tungsten carbide or equivalent wear-resistant inserts are provided in the mold at the locations most likely to wear so as to prolong mold life, and are secured against dislodgement by soldering, as with silver solder or brazing solder, without impairing the hardness of the cavity block 10, force block 11, runner block 13 or pot 15. Moreover, the inserts are mounted so as to be readily removable and replaceable, thereby further increasing the useful life range of the mold.

In accomplishing this, referring to Fig. 1, the cavity block 10 and force block 11 of the mold adjacent the constricted portion of the gate 14 are deeply recessed or cut away, to a much greater extent than necessary to accommodate the carbide inserts, and steel mounting blocks 16 and 17 are secured to the blocks 10 and 11 respectively by cap screws 18. It will be seen that the mounting blocks 16 and 17 replace the stock of the mold blocks 10 and 11 at the constricted portion of the gate 14. Soldered to the mounting blocks 16 and 17 are small carbide inserts 19 and 20 respectively, the insert 19 being edgewise to the insert 20, and the latter insert having a shallow recess 21 in its broad face presented to the insert 19.

The mounting blocks 16 and 17 and carbide inserts 19 and 20 respectively soldered thereto are shaped to form parts of the cavity 12 and gate 14, and the said inserts constitute the constricted portion of the gate and adjacent portions of the cavity which would normally show the most wear. The blocks 16 and 17 are formed of air-hardening or high speed steel or the equivalent having a high decalescence temperature such that the blocks may be hardened and then have the inserts 19 and 20 respectively soldered to them, as by silver soldering or brazing for example, without adversely affecting their temper. Thus the surfaces of the mounting blocks 16 and 17 which are exposed in the mold to the molding composition will be fully wear resistant due to their being full hard.

It will be understood that when the mold is in operation, hot molding material will be forced from the pot 15 by the usual plunger (not shown) through the gate 14 and into the cavity 12, and in so moving it will pass between the inserts 19 and 20, which together form the neck or constricted portion of the gate 14.

By this organization am improved wear resistant mold is provided having small carbide or equivalent wear-resistant inserts anchored by solder and mounted at the points normally most likely to show wear in the mold, all without impairing the temper or hardness of the mold parts, and therefore greatly increasing the useful life of the mold. The carbide inserts and mounting blocks therefor are also readily removable from the mold and replaceable, and in multi-cavity molds may be made interchangeable if desired, resulting in an extremely flexible arrangement which reduces downtime and maintenance, and provides for long life of the mold blocks.

Variations and modifications may be made within the scope of this invention and portions of the improvements may be used without others.

I claim:

1. A wear-resistant mold comprising a body formed of hardened steel the hardness of which is impaired by temperatures required to solder it, said body having a cavity and having a gate connected with the cavity; and an insert in said body, said insert comprising a block of hardened steel, the hardness of which is not substantially impaired by temperatures required to solder it, and said insert further comprising a member of wear-resistant alloy soldered to said block, said member constituting part of the wall of the gate at a constricted portion of the gate and being subjected to the flow of molding material from the gate to the cavity, and said block being secured to said body.

2. A wear-resistant mold comprising a two-part body formed of hardened steel the hardness of which is impaired by temperatures required to solder it, said body having a cavity and having a gate connected with the cavity; and a pair of inserts in said body, each of said inserts comprising a block of hardened steel, the hardness of which is not impaired by temperatures required to solder it, and further comprising a member of wear-resistant alloy soldered to said block, the wear-resistant members of said inserts constituting the entire wall of the gate at a constricted portion of the gate and being subjected to the flow of molding material from the gate to the cavity, and said blocks being clamped to said body.

3. A wear-resistant mold comprising a body formed of hardened steel, the hardness of which is impaired by temperatures required to solder it, said body having a cavity and having a gate connected with the cavity; and an insert in said body, said insert comprising a block of hardened steel, the hardness of which is not impaired by temperatures required to solder it, and said insert further comprising a wear-resistant member of tungsten carbide soldered to said block, said member constituting part of the wall of said gate at a constricted portion of the gate and being subjected to the flow of molding material from the gate to the cavity, and said block being removably secured to said body.

4. A wear-resistant mold comprising a body formed of hardened steel, the hardness of which is impaired by temperatures required to solder it, said body having a molding cavity and having a gate formed with a constricted portion connected with the cavity; wear-resistant means shaped to provide a passage for molding material and adapted to constitute an insert in said body; and a hardened steel mounting for said wear-resistant means, said mounting being secured to said body by heat-free means, and the hardness of said mounting being not impaired by temperatures required to solder it, said wear-resistant means being soldered to said mounting and constituting the entire wall of the gate at the said constricted portion thereof whereby the molding material for the mold flows through said wear-resistant means to the cavity of the said body.

JOSEPH S. HORVATH.

REFERENCES CITED

The following references are of record in the file of this patent:

UNITED STATES PATENTS

| Number | Name | Date |
|---|---|---|
| 1,879,485 | Ramage | Sept. 27, 1932 |
| 2,044,986 | Horton | June 23, 1936 |
| 2,185,625 | Bird | Jan. 2, 1940 |

OTHER REFERENCES

"Machinery," August 1946, pages 150–156. (Copy in Div. 58.)